(12) United States Patent
Howard

(10) Patent No.: US 7,001,068 B2
(45) Date of Patent: Feb. 21, 2006

(54) METHOD AND APPARATUS FOR THE ESTIMATION OF THE TEMPERATURE OF A BLACKBODY RADIATOR

(75) Inventor: John Howard, Wanniassa (AU)

(73) Assignee: The Australian National University, Acton (AU)

(*) Notice: Subject to any disclaimer, the term of this patent is extended or adjusted under 35 U.S.C. 154(b) by 106 days.

(21) Appl. No.: 10/492,889
(22) PCT Filed: Oct. 18, 2002
(86) PCT No.: PCT/AU02/01420

§ 371 (c)(1),
(2), (4) Date: Apr. 16, 2004

(87) PCT Pub. No.: WO03/034007
PCT Pub. Date: Apr. 24, 2003

(65) Prior Publication Data
US 2004/0240517 A1    Dec. 2, 2004

(30) Foreign Application Priority Data
Oct. 18, 2001 (AU) .................................. PR 8329

(51) Int. Cl.
*G01K 11/00* (2006.01)
*G01J 5/00* (2006.01)
(52) U.S. Cl. ...................... 374/161; 374/127; 374/130; 356/491; 356/453
(58) Field of Classification Search ................ 374/161, 374/127, 130; 356/491, 453
See application file for complete search history.

(56) References Cited

U.S. PATENT DOCUMENTS
4,905,169 A    2/1990    Buican et al.

(Continued)

FOREIGN PATENT DOCUMENTS
WO    WO 99/04229    1/1999

OTHER PUBLICATIONS

P. C. Dufour et al., "Fourier-transform radiation thermometry: Measurements and uncertainties," Applied Optics 37(25):5923-5931, Sep. 1998.

(Continued)

*Primary Examiner*—Diego Gutierrez
*Assistant Examiner*—Mirellys Jagan
(74) *Attorney, Agent, or Firm*—Greenlee, Winner and Sullivan, P.C.

(57) ABSTRACT

Remote sensing of the temperature of a greybody or blackbody radiator is effected by passing its radiation (24) through a modulated infrared filter spectrometer. The infrared filter comprises, in sequence, a band pass filter (20), a first polariser (21) which polarises the radiation, an electro-optical element (22) which splits the polarised radiation into two orthogonally polarised components, and a second polariser (23). A lens (28) images the radiation leaving the second polariser onto a detector (27). The electrical signal from the detector (27) is input to a numerical analyser. The electro-optical element (22), typically comprising a birefringent crystal assembly (25) and a birefringent trim plate (26), is configured so that the net optical delay of the orthogonally polarised components passed through it is such that the recombined components are at or near a peak or trough in their interferogram. A sinusoidally varying voltage is applied to the electro-optical element to modulate the net delay of the components passed through the electro-optical element. The numerical analyser is programmed to compute the harmonic amplitude ratio (the ratio of signal amplitudes at the fundamental and second harmonic of the frequency of the modulating voltage) of the signal that it receives from the detector (27). The harmonic amplitude ratio is a function of the temperature of the radiator, which can be estimated by reference to a calibration look-up table.

12 Claims, 5 Drawing Sheets

U.S. PATENT DOCUMENTS

| | | | | |
|---|---|---|---|---|
| 4,970,385 A | * | 11/1990 | Tatsuno et al. | 374/161 |
| 5,053,617 A | * | 10/1991 | Kakizaki et al. | 374/161 |
| 5,245,408 A | * | 9/1993 | Cohen | 356/491 |
| 5,841,536 A | * | 11/1998 | Dimmick | 356/491 |
| 6,111,416 A | * | 8/2000 | Zhang et al. | 324/753 |
| 6,519,040 B1 | * | 2/2003 | Amos | 356/453 |

OTHER PUBLICATIONS

J. Howard et al., "Optical coherence techniques for plasma spectroscopy (invited)," Review of Scientific Instruments 72(1):888-897, Jan. 2001.

J. Howard, "Electro-optically modulated polarizing Fourier-transform spectrometer for plasma spectroscopy applications," Applied Optics 41(1):197-208, Jan. 2002.

* cited by examiner

METHOD AND APPARATUS FOR THE ESTIMATION OF THE TEMPERATURE OF A BLACKBODY RADIATOR

CROSS-REFERENCE TO RELATED APPLICATIONS

This application is the National Stage of International Application No. PCT/AU02/011420, filed Oct. 18, 2002, which claims the benefit of Australian Patent Application PR 8329/01, filed Oct. 18, 2001, both of which are hereby incorporated by reference to the extent not inconsistent with the disclosure herewith.

TECHNICAL FIELD

This invention concerns the estimation, by remote observation, of the temperature of a blackbody or a greybody radiator. More particularly, it involves the estimation of the temperature of a radiator by a relatively low resolution spectral technique, using a novel form of optically filtered and electro-optically modulated interferometer. The interferometer or spectrometer (which is one aspect of the present invention), operates in the infrared and/or visible region of the electromagnetic spectrum. The method of the invention involves the processing of a selected region of the interferogram produced by the filter spectrometer.

BACKGROUND TO THE INVENTION

Non-contact optical thermometry is a rapidly growing field with applications in remote-sensing of hostile or corrosive environments, medical imaging, environmental studies and industrial process monitoring. The current best practice in remote temperature sensing involves the use of cryogenic infrared radiometers.

Infrared radiometers are passive sensors operating at wavelengths near 10 µm that measure the "brightness temperature" of the infrared radiation emitted by a radiating body in the environment The temperature sensitivity of an infrared radiometer is determined by its ability to resolve small changes in the radiant emission against background noise. Using sensitive cryogenic quantum well infrared photodetectors (QWIP), temperature sensitivity can be better than 0.02 C.

If the radiating body is a perfect blackbody (an object with 100% emissivity), the brightness temperature is equal to the physical temperature of the radiating body. However, the brightness temperature is less than the physical temperature for an object with an emissivity below 100%. Thus a determination of the physical temperature of a radiating body requires an estimation of the emissivity of the radiator. One consequence of the dependence of the temperature uncertainty on errors in the estimated emissivity is that a 10% inaccuracy in the estimate of the emissivity can give rise to errors of the order of a few percent in the inferred temperature (in degrees Kelvin). In addition, the inferred temperature can be substantially in error if the radiating source does not fill the field of view of the measurement system. The likelihood of such errors has meant that, in many applications, methods of temperature measurement which rely on the spectral information are now preferred over infrared radiometers.

One spectral technique is two-colour pyrometry. Using this technique, the temperature of a radiating body is inferred by measuring the ratio of the source radiation intensity at two independent wavelengths and applying Planck's radiation law, which states that the blackbody spectral radiance is a universal single parameter distribution governed by the temperature T of the radiating source. Planck's law is usually represented by the relationship $$H(v; T) = \frac{2hv^3}{c^2} \frac{1}{\exp(hv/kT) - 1}$$

Integrated over wavelength, the total power P radiated by a surface of area A and emissivity $\in$ at temperature T is given by the relationship $$P = \in A \sigma T^4$$

where $\sigma$ is the Stefan-Boltzmann constant. In general, the emissivity $\in(v,T)$ is dependent on both wavelength and temperature.

In two colour pyrometry, the ratio of the power radiated from a body at two selected, narrow wavelength bands is measured. This approach obviates the need for knowledge of the emissivity or its temperature variation. However, either (a) the radiating body must be grey (that is, its emissivity is less than 1, and is independent of wavelength), in which case $\in(v) = \in$, or (b) the spectral dependence of $\in$ must be known. As well as having a reduced sensitivity to emissivity, ratio pyrometers have the benefit of being insensitive to obscuration of the field of view due, for example, to dust, smoke, obstruction, or lens contamination.

Another technique that relies on being able to treat the radiation source as a greybody, in the sense that the spectral variation of the emissivity is unimportant in the region of interest, is Fourier-transform infrared (FTIR) spectroscopy. Fourier transform infiared spectrometers are usually configured as Michelson interferometers in which the translation of one of the mirrors (often piezoelectrically actuated) produces an interference pattern that is registered by a detector or detector array.

It was reported, recently, by P. C. Dufour, N. L. Rowell and A. L. Steele, in their paper in *Applied Optics*, volume 37, 1998, page 5923, that although spectral techniques are not as sensitive to small temperature changes as radiometers, FIIR spectrometers are now achieving sub-degree temperature resolution.

However, current FTIR spectroscopy does have some disadvantages. For example, for optimum performance, FTIR spectrometers must be carefully aligned. They can also be bulky and sensitive to external noise, and require a computer for Fourier inversion of the interferogram and display of the spectrum. They are not readily configurable as imaging devices; they have limited field-of-view; and they usually require optical path length monitoring using a suitable fixed wavelength source such as a laser.

A recently developed spectral instrument is the so-called MOSS (modulated optical solid-state) spectrometer, which monitors the complex coherence (fringe visibility and phase) of an isolated spectral line at one or more optical delays. This instrument has been used for visible light Doppler imaging of high temperature plasmas in the H-1 heliac. The MOSS spectrometer is described in the specification of International patent application No. PCT/AU98/00560, which is WIPO Publication No. WO 99/04229. It is also featured in the paper by J. Howard, C. Michael, F. Glass and A. Cheetham in *Review of Scientific Instruments*, volume 72, 2001, page 888. More information about the MOSS system, which is useful in high-resolution studies of spectral lineshape, can be found at the web address htt://rsphyhsse.anu.edu.au/prl/MOSS.html.

DISCLOSURE OF THE PRESENT INVENTION

The present invention is a method for measuring the broadband infrared blackbody radiation of a body radiating in the infrared and/or visible region of the electromagnetic spectrum, and an electro-optical birefringent plate interferometer for use in such measurement.

FIG. 1 of the accompanying drawings is a schematic illustration of a known form of birefringent filter (sometimes called a Lyot filter), with graphical representations of associated features at different locations in the optical path through the filter.

The known filter of FIG. 1 comprises a band pass filter 10, a first polariser 11, a birefringent plate 12 and a second polariser 13, with the radiation 14A leaving the second polariser being monitored by a photo-tube (photomultiplier) 19. Assume that the input radiation 14 to the band pass filter 10 has an amplitude versus wavelength relationship, in the visible and infrared regions of the electromagnetic spectrum, as shown in graphical representation 16 of FIG. 1. The band pass filter 10 restricts the radiation incident upon the first polariser 11 to that which lies between the lower and upper wavelengths of the filter 10, as shown in the amplitude versus wavelength graphical representation 17 of FIG. 1. The first polariser 11 polarises the radiation passing through it and the birefringent plate 12 splits the polarised light into two components which travel through the birefringent plate at different velocities. Thus one of the components of the polarised radiation is delayed, relative to the other component, within the birefringent plate.

When the two components leave the birefringent plate, they are combined by the second polariser 13 to produce a beam 14A of radiation which has an amplitude that depends on the net path delay between the components within the birefringent plate 12. Graphical representation 18 of FIG. 1 shows how the amplitude of the beam 15 varies with the delay within the birefringent plate. The curve depicted in the graphical representation 18 is known as the interferogram of the filter. The peaks and troughs of the interferogram are known as "fringes".

If the birefringent plate is an electro-optical material (that is, a material which acquires its birefringence by the application of an electric field; such a phenomenon being known as the Kerr effect, or the Pockels effect), the Lyot filter shown in FIG. 1 is known as an electro-optical filter.

The present invention, in its apparatus form, is a modified form of the Lyot filter shown in FIG. 1.

The present invention utilizes the fact that, within a narrow fixed wavelength band, the emission intensity is a strong function of temperature, and the blackbody emission spectrum has a wavelength of peak emission $\lambda_M$ (see FIG. 1 of the accompanying drawings), which is uniquely related to the temperature of the blackbody radiator. The wavelength of peak emission, $\lambda_M$, is given by Wein's displacement law $$\lambda_M T = 2.898 \times 10^{-3} \text{mK}.$$

Thus, determining $\lambda_M$ or some spectral quantity related to it, allows one to infer the temperature of the source. However, due to the slowly varying nature of the blackbody spectrum with small changes in the temperature of the radiator, accurate estimation of $\lambda_M$ requires measurements over a significant spectral region.

The present inventor has recognized that when the temperature of a radiating blackbody changes, with consequential shifts in $\lambda_M$, the shape of the pass band curve of the graphical representation 17 of FIG. 1 changes and, if the filter shown in FIG. 1 is used to observe radiation from the blackbody radiator, the shape of the interferogram of the beam 15 (see graphical representation 18) also varies by a small amount. Furthermore, by the complementarity of time and frequency domain systems, shifts in $\lambda_M$ should be manifest over a small range of optical delay that can be probed with an electro-optical spectrometer. Since the spectral bandwidth required to characterize the blackbody temperature is wide and the temporal coherence is small, most of the spectral information resides in the interferogram close to zero delay.

The first spectral moment of the radiation received in a given spectral pass band (related to $\lambda_M$) is conveyed by a single measure of the interferogram, the interferogram phase. The effective spectral width of the received radiation is carried by the curvature (fringe visibility) of the interferogram at small delay. Thus changes in temperature of the radiating body result in changes in the phase and fringe visibility of the interferogram.

Furthermore, measurement of the amplitude and phase of the interferogram is equivalent to a measurement of the blackbody spectrum in a transmitted pass band. Measurement of the phase is sufficient to infer the source temperature. Measurement of the amplitude, in conjunction with the Stefan-Boltzmann equation and the temperature value, allows an estimate of the source emissivity to be inferred.

The present inventor has also appreciated that a modulation of the delay in the birefringent plate of the Lyot filter described above will generate a modulation in the light intensity sensed by the detector. Therefore the temporal properties of this modulation of light intensity can be used to estimate the source temperature, for the measurement of a single quantity closely related to the phase of the interferogram near zero delay will provide a direct, robust and unambiguous measure of the source temperature. In particular, it can be shown, by a theoretical analysis (which is provided later in this specification), that the ratio of the fundamental (first harmonic) and second harmonic amplitudes of the interferogram, near a peak or trough in the interferogram, is related to the phase of the interferogram, which in turn is related to the source temperature through the dimensionless sensitivity factor ρ, which is approximately equal to hv/kT.

Thus, according to the present invention, a method for the estimation of the temperature of a body emitting radiation in the infrared and/or visible region of the electromagnetic spectrum comprises the steps of (a) selecting radiation from said body within a predetermined wavelength band;

(b) polarising said selected radiation by passing it through a first polariser, (c) passing said polarised selected radiation through a birefringent element to split said polarised radiation into first and second orthogonally polarised components which travel through said birefringent element at differing velocities, so that, on leaving said element, there is an optical path length delay of one component relative to the other component within said birefringent element;

(d) passing said components through a second polariser to combine said components; and (e) observing the intensity value at the point in the interferogram produced by combining said first and second components;

characterised in that said birefringent element is an electro-optical birefringent element which is configured so that the net optical path delay between said first and second components is such that, on combination of said components, said intensity value is the intensity value at or near a peak or a trough in said interferogram; and further characterised by the additional steps of (f) modulating the optical path length delay in said electro-optical element, by applying a periodically varied voltage (preferably a sinusoidally varying voltage) to said electro-optical element;

(g) calculating the harmonic amplitude ratio, which is the ratio of the amplitudes of the observed intensity at the fundamental and second harmonic of the frequency of the modulating voltage, at the observed point of the interferogram; and (h) determining, from the value of said harmonic amplitude ratio, the temperature of said radiating body by comparing said harmonic amplitude ratio with values of this ratio in a calibration look-up table.

Also according to the present invention, there is provided an electro-optically modulated birefringent filter comprising, in sequence, (a) a band pass filter, which permits the passage therethrough of radiation from a radiating body in a predetermined wavelength band;

(b) a first polariser;

(c) an electro-optical element which, when a voltage is applied to it, splits incident polarised radiation into first and second orthogonally polarised components which travel through said element at different velocities;

(d) a second polariser, to combine said components as they exit from said electro-optical element; and (e) observing means to observe the intensity value at the point in the interferogram produced by combining said first and second components;

characterised in that (f) a voltage supply means, adapted to supply a periodically varying voltage, is operatively connected to said electro-optical element to produce a modulated the birefringence of said element;

(g) said electro-optical element is configured so that, in the absence of an applied modulating voltage, the net optical path length delay between said first and second components is such that, on combination of said components, said intensity value is the intensity value at or near a peak or a trough in said interferogram; and (h) said observing means includes means to generate a signal indicative of the observed intensity value, said signal being input to analysing means which evaluates the harmonic amplitude ratio, which is the ratio of the amplitudes of the intensity at the fundamental and second harmonic of the frequency of the modulating voltage, at the observed point of the interferogram.

Preferably, the analysing means is a numerical analyser which is programmed to compute the ratio of the peak intensities in the wave pattern of the fringes of said signal output at the fundamental and second harmonic frequencies of said modulating voltage, and to compare this ratio with a calibration look-up table, to determine and display the temperature of the radiating body.

Examples of the electro-optical element that may be used in the present invention are:

(a) a compound electro-optical element consisting of two crossed uniaxial birefringent crystals of nominally equal delay, each propagating radiation along the crystal Y-axis, with a bias voltage applied to produce a predetermined short delay of one of said components relative to the other component;

(b) a compound electro-optical element consisting of two crossed uniaxial birefringent crystals of nominally equal delay, each propagating radiation along the crystal Y-axis, with no bias voltage applied (and thus with no net birefringence), in series with a birefringent trim plate which produces a predetermined short delay of one of said components relative to the other component;

(c) a single electro-optical crystal propagating along the Z-axis, with no bias voltage applied (and thus with no birefringence), in series with a birefringent trim plate to produce a predetermined short delay of one of said components relative to the other component; and (d) an isotropic electro-optical plate with no bias voltage applied (and thus with no birefringence), in series with a birefringent trim plate to produce a predetermined short delay of one of said components relative to the other component.

Preferably, the frequency of modulation of the optical path length is away from the low-frequency "1/f", or flicker noise associated with photoconductors. Modulation of the interferogram signal allows the use of synchronous detection techniques to improve the signal to noise ratio (SNR), which is inversely proportional to the square root of the detection bandwidth.

For a better understanding of the present invention, embodiments thereof will now be described, by way of example only, with reference to the accompanying drawings.

DETAILED DESCRIPTION OF EMBODIMENTS OF THE INVENTION

Figure 1:
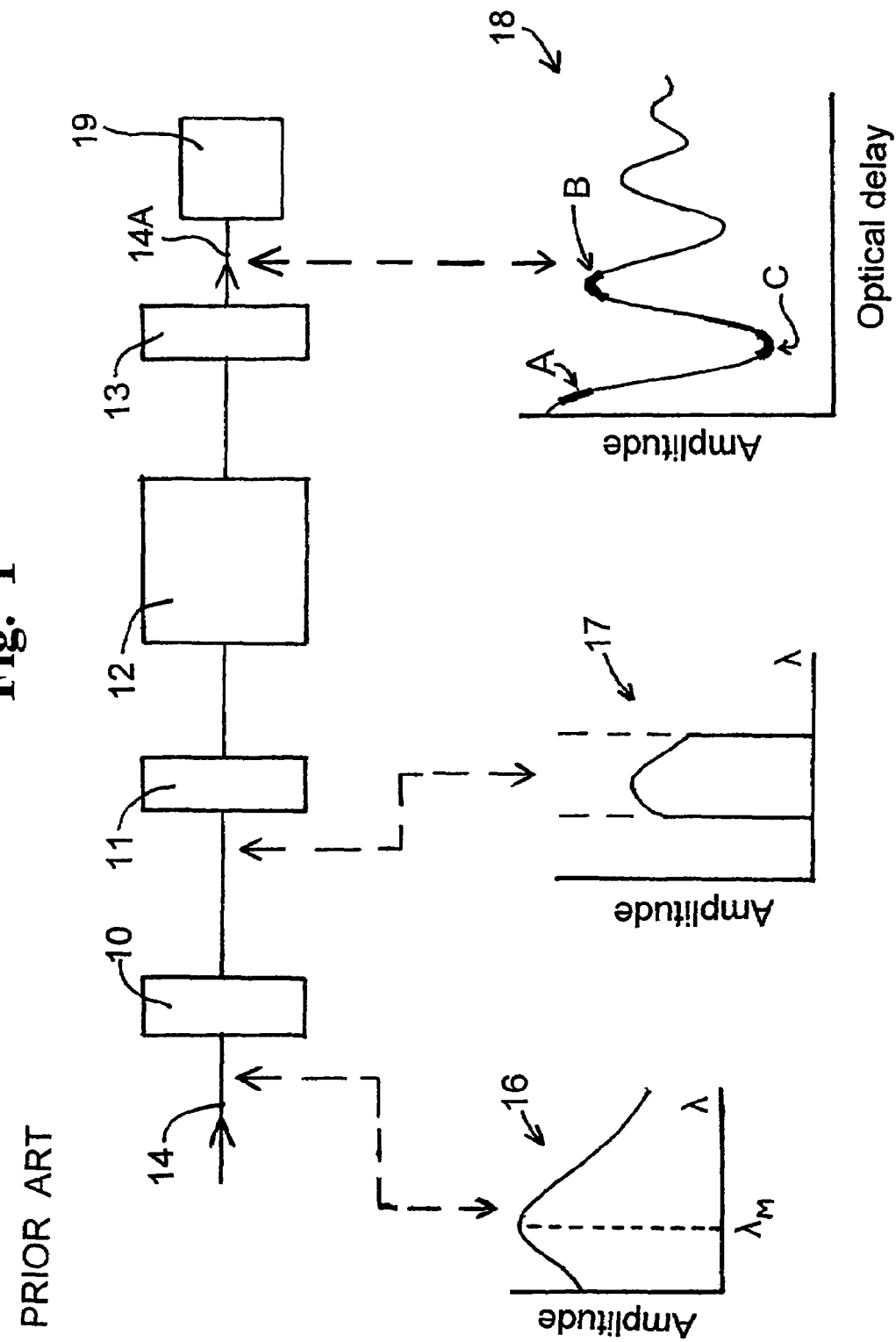
FIG. 1, as noted earlier in this specification, is a schematic illustration of a known form of birefringent filter (sometimes called a Lyot filter), with graphical representations of associated features at different locations in the optical path through the filter.
Figure 2:
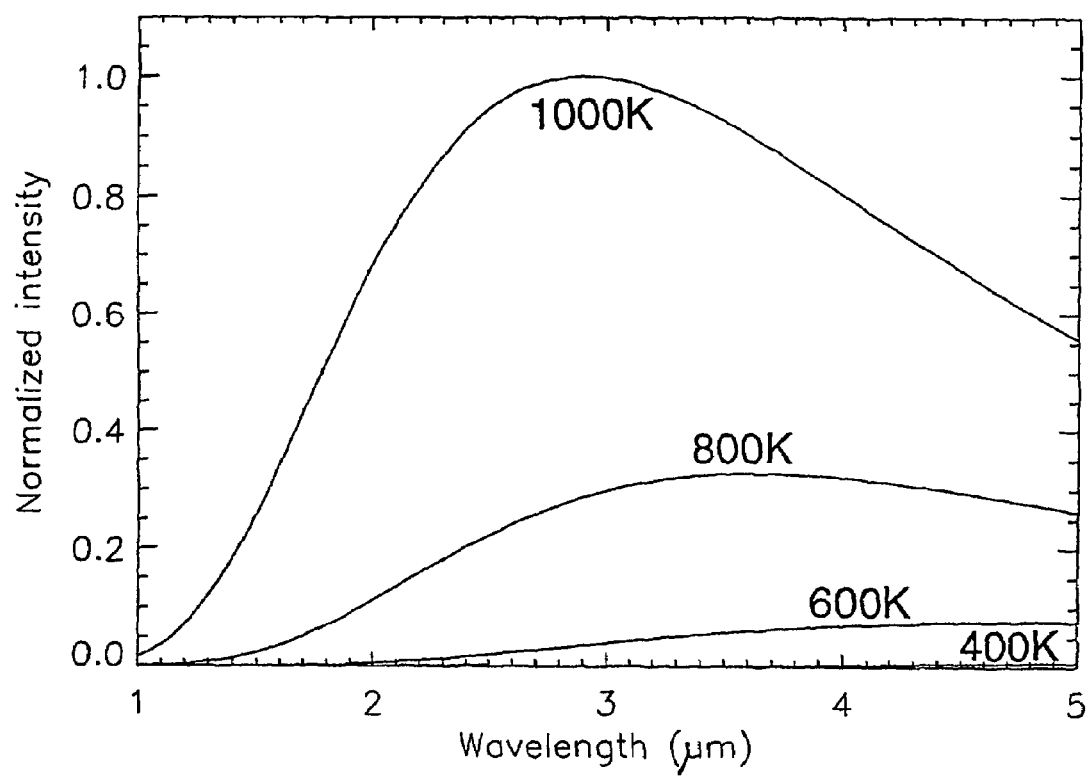
FIG. 2 shows the blackbody emission spectra, in the wavelength band of from 1 to 5 $\mu$m, for temperatures spanning 400K to 1000K.
Figure 3:
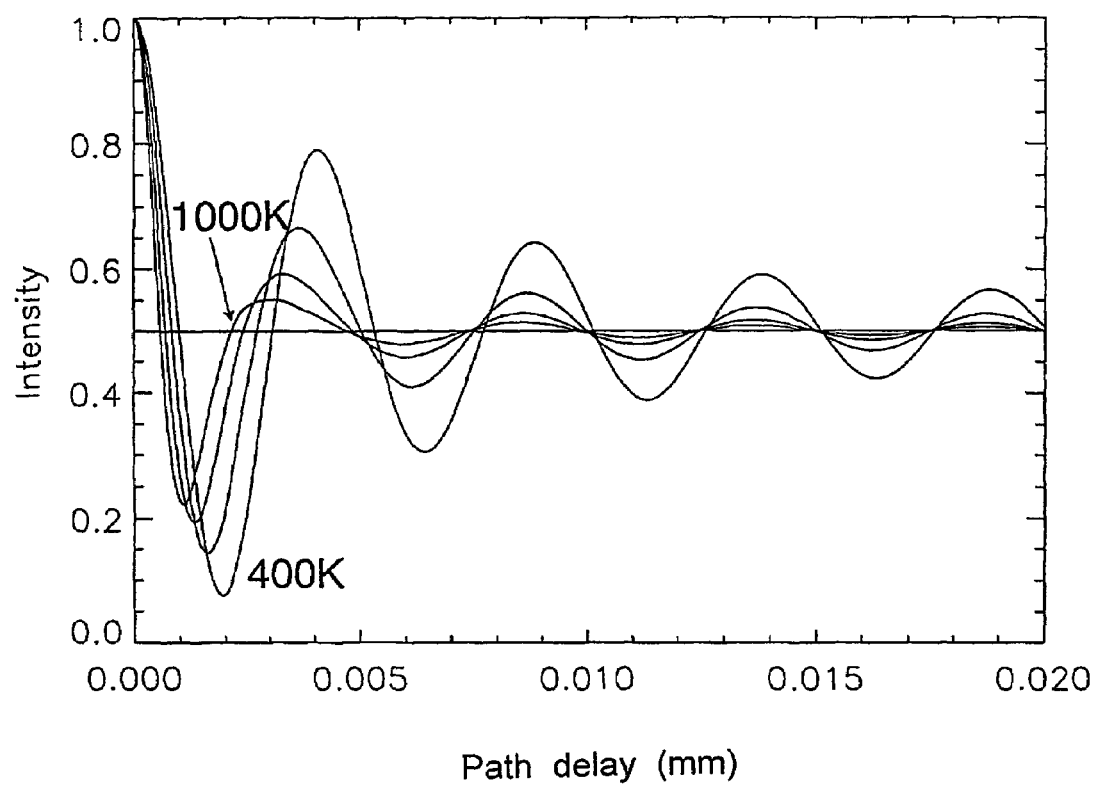
FIG. 3 depicts interferograms obtained from blackbodies, using the apparatus shown in FIG. 1.

Part of the emission spectra of several blackbody radiators is shown in FIG. 2. If radiation from these radiators is passed through an electro-optical filter as shown in FIG. 1, with the band pass filter 10 being a top hat band pass electro-optical filter, spanning the range of from 1 to 5 $\mu$m, the resultant fringe pattern of the interferogram of the output radiation 15 (shown as a plot of intensity of the received radiation against the delay introduced by the electro-optical filter) is as shown in FIG. 3. FIG. 3 is, in fact, the Fourier transform of the emission spectra of FIG. 2.

It is clear from FIG. 1 that, as noted above, it is the shape of the interferogram near zero delay that is most closely related to the source temperature. At the offset delay, or operating point, below the first interferogram zero, shown by the region A in the graphical representation 18 of FIG. 1, the slope of the interferogram increases with temperature, while the fringe visibility decreases.

If the delay in the birefringent element is electro-optically scanned about an operating point close to a peak (or trough), the tangent of the appropriately weighted second and first harmonic amplitudes measures the phase in the modulation cycle at which the interferogram turning point (related to $\lambda_M$) is encountered. The ratio of the amplitudes of the fundamental frequency and the second harmonic components of the interferogram, generated by modulation of the fringes of the interferogram, is a sensitive measure of the position of the turning point. This ratio of the fundamental and second harmonic amplitudes of the fringes of the interferogram can be used to estimate temperature.

Figure 4:
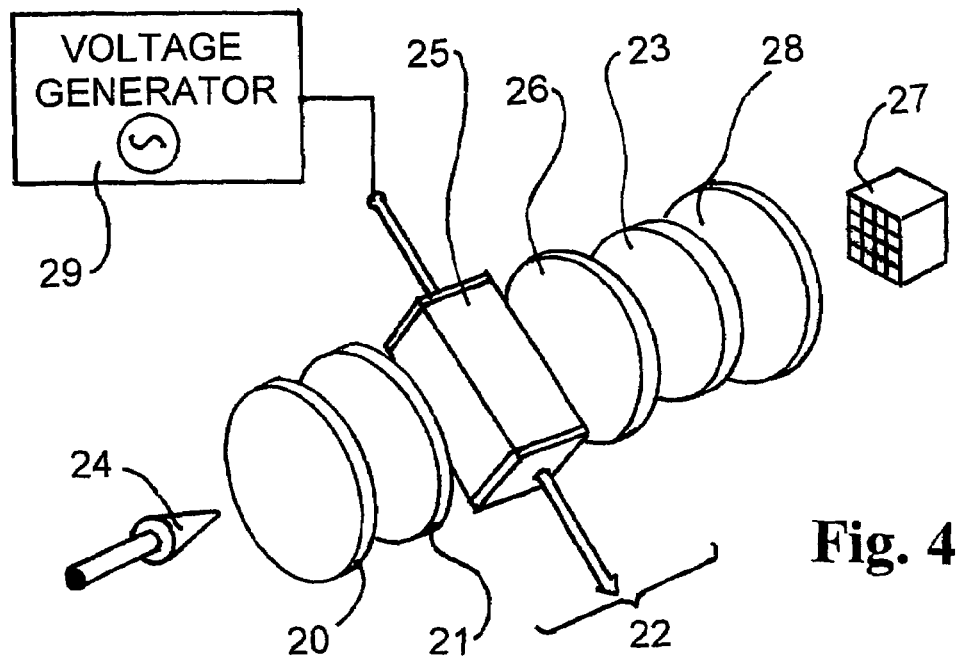
FIG. 4 is a schematic representation of an electro-optical filter constructed in accordance with the present invention.

A spectrometer incorporating an electro-optically modulated birefringent filter, constructed in accordance with the present invention, is illustrated in FIG. 4. It will be apparent that the filter shown in FIG. 4 is a modified form of the electro-optical filter shown in FIG. 1. Since the spectrometer of FIG. 4 is a modulated infrared filter spectrometer, the present inventor has coined the term "MIRF spectrometer" as a convenient reference term, although it should be apparent to persons of skill in the field of remote sensing that the present invention operates outside the infrared portion of the electromagnetic spectrum.

The filter of FIG. 4 has an electro-optic element 22 in place of the simple birefringent plate of the filter of FIG. 1. The electro-optical element 22 is sandwiched between broadband wire grid, plate or dielectric polarisers 21 and 23. The optical delay in the birefringent crystal is given by $\tau=LB(\lambda)/c$, where L is the thickness of the crystal in the direction of propagation and $B(\lambda)=n_E(\lambda)-n_o(\lambda)$ is the crystal birefringence.

In the absence of an applied modulating voltage, the electro-optical element 22 is required to provide only a short delay to the two polarised radiation components propagating through it. Thus it is preferred that the electro-optical element 22 has one of the following four alternative constructions:

1. two crossed uniaxial birefringent crystals, each propagating radiation along the crystal Y-axis (the so-called Y-cut of the crystals) and having a conventionally applied dc electric field, so that the optical delays of the crystals almost cancel each other;
2. two crossed uniaxial birefringent crystals, each propagating radiation along the crystal Y-axis, with no applied bias field, but with a separate birefringent plate (called a "trim plate") in series with the crossed crystals, to provide a suitable net optical delay offset;
3. an electro-optical crystal with radiation propagating along the crystal Z-axis) with no bias voltage applied and with a separate birefringent trim plate in series, to provide a suitable optical delay offset; and
4. an isotropic electro-optical plate, which exhibits no birefringence in the absence of an applied electric field, with a separate birefringent "trim plate" in series, to provide a suitable optical delay offset.

If the first of these four alternatives is adopted, both lithium niobate ($LiNBO_3$) and lithium tantalate ($LiTaO_3$) are suitable materials, being electro-optic, birefringent and transparent to radiation in the range of visible light to 5 $\mu$m. However, because the required net optical path length delay is small, lithium tantalate, which is weakly birefringent, is the preferred material. Both of these uniaxial crystals are naturally birefringent for radiation propagating along the crystal Y-axis, and their birefringence can be modified by applying an electric field in the Z-direction, parallel to the crystal fast axis and transverse to the direction of propagation. Combining two such crystals with their fast axes mutually oriented at 90° but with applied electric fields of opposite polarity will subtract their respective delays (to give a small net delay). However, if the applied electric fields of opposite polarity are modulated, the modulation components will be added, thereby improving the modulation depth.

Lithium niobate and lithium tantalate are also the preferred crystals for the second alternative electro-optic element construction. The "trim plate" is a thin birefringent crystal. Birefringent "trim plates" or "trim pieces" are known components of birefringent systems. The trim plate may be formed integrally with one of the two crossed birefringent crystals.

Magnesium fluoride ($MgF_2$) is another infrared transmissive birefringent material that is suitable for the construction of a crossed crystal assembly. Magnesium fluoride is attractive because it has a high transmissivity at wavelengths of from 100 nm to 8000 nm, a low refractive index (1.35), a small, reasonably achromatic birefringence and a modest temperature coefficient. It should be noted that combining waveplates having different material properties allows the construction of thermally stable compound plates.

If the fourth alternative arrangement for the electro-optical element is adopted, cadmium telluride (CdTe) is a convenient isotropic crystal to use. If, however, a birefringent crystal oriented for propagation along the Z-axis is used (the third alternative), lithium niobate is a suitable crystal material. It has zero natural birefringence when propagating radiation along the Z-axis, but the application of an electric field along the Y-axis of the Z-cut crystal will induce a birefringence that can be used to modulate the path length delay in the Z-axis direction. A potential disadvantage of the use of a crystal propagating along the Z-axis is the need to use drive voltages, to produce the required electric field, that can be 30 per cent greater than that needed for the crossed Y-cut crystals. Because isotropic and/or Z-cut crystals exhibit no natural birefringence, they are less susceptible to thermally induced drifts in the net optical delay. This is beneficial for the reliability of the temperature estimate provided by the present invention.

A voltage supply 29 is connected to the electro-optical element 25 to establish the appropriate degree of modulated birefringence when the filter of FIG. 4 is in use. Whichever of the alternative arrangements for the electro-optical element is used, the modulation (preferably sinusoidal) of the optical delay in the element 25 is effected by modulating the amplitude of the voltage applied by the supply 29 to the birefringent crystal or crystals. If crossed electro-optical crystals are used, the modulated voltage may be applied to one of the crystals only. If the modulated voltage is applied to both of the crystals, a smaller amplitude of the modulation voltage may be applied to each of the crystals in a manner such that the changes in the optical delays of the two crystals are cumulative and synchronised.

A sinusoidal modulation drive voltage can be generated using a simple function generator, a stereo audio amplifier and step-up transformer. Preferably, the modulation frequency is chosen to match the time resolution and hardware requirements dictated by the end use of the filter.

The input radiation being monitored (beam 24 in FIG. 4) can be coupled directly to the filter or it can be input from an optical fibre and collimating lens combination.

When the arrangement shown in FIG. 4 is in use, the output beam will be monitored and processed, in accordance with the method of the present invention, to calculate the ratio of the amplitudes of the first and second harmonics of the modulating voltage frequency, at or near a peak or trough (for example, the region B or C in FIG. 1) of the interferogram. From the value of this ratio, reference to a calibration look-up table will provide an estimate of the temperature of the body producing the input beam of radiation 24.

The processing of the output beam can be conveniently effected by imaging the output beam onto a detector array, such as a CCD array, which produces an output electrical signal. This electrical signal can be digitally acquired and submitted to a numerical analyser (a computer) that is programmed to compute the harmonic amplitude ratio. If an absolute value of the temperature of a radiating body is to be determined by a MIRF spectrometer constructed in accordance with the present invention, the spectrometer can be calibrated against a known greybody to generate a look-up table for the numerical analyser.

As noted earlier in this specification, a preferred feature of the numerical analyser is that it evaluates and displays the amplitude ratio or (after calibration of the spectrometer to establish a look-up table that is stored in the numerical analyser) a temperature value.

For some applications, it is not essential that the MIRF spectrometer of the present invention is calibrated to give a direct reading of the temperature of a radiating body. For example, the spectrometer may be used to monitor a radiating body (perhaps a furnace) that is used in a commercial process which needs to be maintained within a specific temperature range. The analyser can be programmed to recognize when the received signal indicates the harmonic amplitude ratio of the radiating body when the process temperature is at its optimum value, and to provide an indication (optionally including an alarm) when the temperature of the body under observation has changed to a value indicating that the process temperature has departed from its optimum value by a predetermined number of degrees. When such a departure occurs, heat will be supplied to the process (or the process will be cooled) until the optimum value of the process temperature has been restored.

As a demonstration of the present invention, a MIRF spectrometer constructed as shown in FIG. 4 was set up to monitor radiation from a filament light source. The temperature of the filament lamp was a known function of the voltage across the lamp. The electro-optical element was two crossed lithium niobate crystals, each having a length of 50 mm and a square aperture of side 25 mm. These crystals were interposed between two broadband red-optimised (620 to 1000 nm) polarizing beamsplitting cubes. In view of the large thicknesses of the lithium niobate crystals, apertures having diameters in the range of from 3 to 5 mm were used to collimate the beam from the lamp source, to ensure a high instrument contrast. A Hamamatsu red-sensitive gallium arsenide photomultiplier tube (model R943-02; 200 to 900 nm) was used as detector. A PC-based DAQ card operating under "PC-MOSS" software control was used in conjunction with a high voltage amplifier to generate the modulating voltage (at 100 Hz) applied to the crystals. The signals were synchronously acquired using the same PC-based DAQ system.

A portion of the interferogram was measured by applying a linear ramp of peak amplitude 4000V across the $LiNbO_3$ crystals. A bias offset of −2000V was required to compensate for a small mismatch in the crossed crystal lengths giving rise to incomplete dc cancellation of the optical path length. This bias allowed a portion of the interferogram on both sides of the "white light" position (corresponding to zero net delay) to be measured. The interferograms were arbitrarily normalized according to their minimum and maximum peak values.

The measured interferograms were compared with computed interferograms for a range of blackbody temperatures. The computation of interferograms assumed that only radiation in the band 600 to 900 nm contributed to the interference signal. There was close similarity between the measured and the computed interferograms, including reasonable agreement about the electro-optic drive voltages required to probe the interferogram. The minor discrepancies that were observed were probably due to the choice of effective optical bandwidth which had been used for the calculations.

Using the same experimental arrangement, the sensitivity of the interferogram to temperature was investigated. A 200 Hz sinusoidal modulation of amplitude 500V was applied to the dc voltage of 1900V supplied to the electro-optic crystals. The temperature of the filament lamp was varied slowly (that is, in about 10 seconds) by sweeping the filament voltage. During this sweep of filament voltage, the interferogram was recorded using the PC-MOSS system, and the ratio of fundamental and second harmonic amplitudes was calculated as a function of filament voltage. The results obtained in this exercise showed that the filament voltage could be determined within 0.04V, corresponding to a resolvable temperature change of a few degrees Kelvin. Better resolution could have been obtained by increasing either the integration time (which was 25 milliseconds in these experiments) or the spectral bandwidth.

Uses of the Present Invention

Because it is a spectrally discriminating device, a MIRF spectrometer incorporating the present invention does not require absolute intensity calibration, as is the case for radiometric-based instruments such as IR cameras. On the other hand it is much simpler and more compact than Fourier transform infrared (FTIR) spectrometers, to which it is related.

If the instrument is absolutely calibrated, the intensity and phase measurements together can be used to infer the emissivity of the radiating source. Even if not absolutely calibrated, intensity and phase fluctuations taken together can be used to estimate fluctuations in source emissivity. This can have applications in metals manufacturing (for example, in discriminating slag against molten steel).

When calibrated using a source of known temperature, the present invention can be used for remote measurement of the temperature of a body. As an absolute temperature measuring instrument, it is a convenient and reliable device for calibrating infrared cameras. As a prefilter to a single channel or imaging infrared radiometer, the present invention allows the source emissivity to be immediately determined (removal of the MIRF prefilter means that the radiometer may subsequently be used for sensitive absolute temperature monitoring). When combined with a mid-IR imaging camera and appropriate software, the present invention can, in principle, deliver time resolved temperature contours of a radiating body.

If a MIRF spectrometer including the present invention is used with an infrared camera and the modulation voltage frequency of the filter of the spectrometer is an integral sub-harmonic of the frame rate of the IR camera, algebraic manipulation of the images captured in successive camera frames enables temperature contours of a body being imaged to be obtained. If required, the temperature contour information may be displayed by the camera.

A MIRF spectrometer constructed in accordance with the present invention, in which the birefringent element is a multicrystal system, with the crystals mounted so that the axis of each crystal is at angle to the crystal axis of the (or each) other crystal in the element, so that the coherence of the received radiation may be probed simultaneously at a number of optical delays, may also be used advantageously in heat contaminated situations.

Among the other applications in which the MIRF spectrometer may be used are:

1) industrial process monitoring (including heat treating, forming and extruding, tempering, and the annealing of glass, metals, plastics and rubber, quality control in the food and paper pulp industries, and curing processes for resins, adhesives and paints;
2) non-contact temperature sensors in military, medical, industrial, meteorological, ecological, forestry, agriculture and chemical applications (where regular absolute temperature calibration is essential);
3) in an infrared emissivity-based discrimination of missile and aircraft engine spectral signatures;
4) in plasma physics, as a monitor of the heat flux to plasma facing components (first wall and plasma limiting tiles), which are subjected to loads of up to 5 MW/m in a fusion tokamak; and
5) in thermal imaging in medicine (for example in the early detection of breast cancer and for locating the cause of circulatory disorders which lead to local heating and inflammation, which can be detected with an infrared imager).

These examples of the use of the present invention are not exhaustive.

Benefits of the Present Invention

As with other techniques that rely on spectral shape estimation of temperature, a MIRF spectrometer, constructed in accordance with the present invention, is not as sensitive to temperature changes as a brightness radiometer. However, particular benefits of the spectrometer of the present invention, compared with other infrared imaging systems are:

(a) because it multiplexes spectral information temporally (via the modulation cycle) rather than onto two separate detector arrays or through separate rotating filter elements, the present invention is much less cumbersome—and less expensive—than dual band (two colour) optical pyrometers; and
(b) it is a relatively inexpensive, more compact (and therefore portable) alternative to mechanically scanned FTIR spectrometers.

Theoretical Analysis

The blackbody spectrum of a radiating source is expressed (see earlier in this specification) by the relationship $$H(v; T) = \frac{2hv^3}{c^2} \frac{1}{\exp(hv/kT) - 1}$$

Using the dimensionless parameter $x=h\lambda/kT=hc/\lambda kT$, the blackbody spectrum can be expressed as $$H_v(v;T) = \alpha T^3 H(x) \quad (1)$$

Where $\alpha$ is a constant and the universal spectral depend function $$H(x) = \frac{x^3}{\exp x - 1} \quad (2)$$

Figure 5:
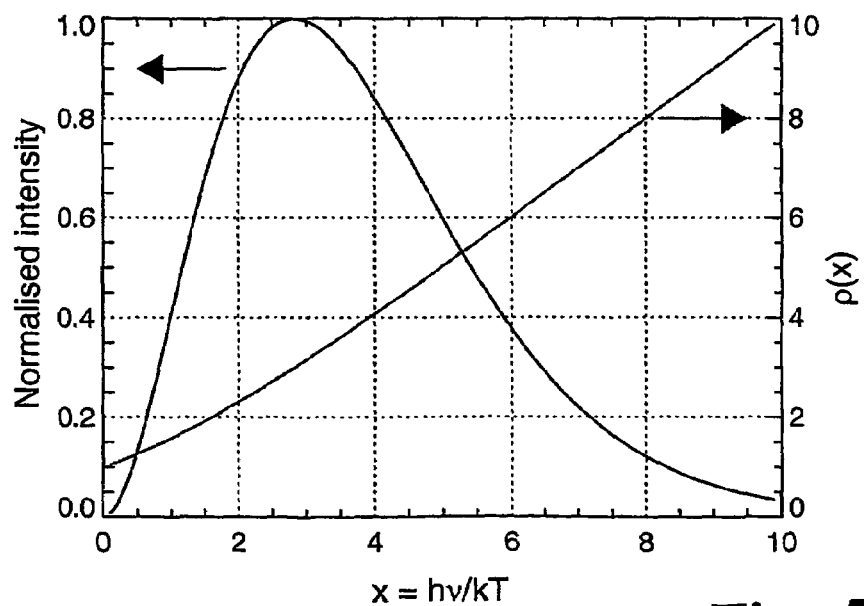
FIG. 5 shows the variation of the universal blackbody spectrum, and also the variation of the radiometric temperature sensitivity factor $\rho(x)$, as a function of the dimensionless parameter $x=h\nu/kT$.

This distribution is shown in FIG. 5.

If the radiator temperature increases incrementally by $\Delta T$, the radiant intensity also increases such that $$\frac{\Delta H_v}{H_v} = \rho(x) \frac{\Delta T}{T} \quad (3)$$

where $$\rho(x) \equiv \frac{T}{H_v} \frac{\partial H_v}{\partial T} = \frac{x \exp x}{\exp x - 1} \quad (4)$$

is the normalised differential radiometric temperature sensitivity. Note from FIG. 5 that $\rho(x) \approx x$ is an excellent approximation over much of the spectrum.

In the case of a Fourier transform infrared (FTIR) spectrometer, the ideal FTIR signal intensity (interferogram) can be expressed as $$S_\pm(\tau) = \frac{I_0}{2}[1 \pm \mathcal{R}[\gamma(\tau)]] \quad (5)$$

where $I_0$ is the spectrally integrated emission intensity, $\tau$ is the optical path time delay between interfering wavefronts and $\gamma(\tau)$ is the optical coherence, related to the light spectral radiance $H_v(v)$ through the Weiner-Khinchine theorum $$\gamma(\tau) = \frac{1}{I_0} \int_{-\infty}^{\infty} H_v(v) \exp(i2\pi v \tau) dv \quad (6)$$

In practice, the maximum fringe visibility (at $\tau=0$) is reduced by the instrument spectral response to less than unity. This is accounted by multiplying the complex coherence $\gamma$ by the instrument coherence $\gamma_I = \zeta_I \exp(i\Phi_I)$ where $\zeta_I < 1$ is the instrument contrast and $\Phi_I$ the instrument phase. Unless otherwise indicated, it will be assumed that $\zeta_I = 1$.

The change in the spectral centre-of-mass with temperature is manifest as a change in the interferogram carrier frequency. The variation gives rise to a temperature-dependent shift in the interferogram phase which increases with time delay. To estimate the size of this effect, the optical bandwidth is taken to be sufficiently narrow to allow a linear approximation to the blackbody spectral radiance at optical frequency $v = v_0 + \delta v$:

$$H_v(v) \approx H_0 \left[1 + \beta(x_0) \frac{\delta v}{v_0}\right] \quad (7)$$

where $$\beta(x_0) = \frac{x_0}{H_0} \frac{\partial H}{\partial x}\bigg|_{x_0} = 3 - \rho_0 \quad (8)$$

with $x_0 = h\nu_0/kT$, $H_0 \equiv H_\nu(x_0)$ and $\rho_0 = \rho(x_0)$ given by Equation (4) (see also FIG. 5). Substituting Equation (7) into Equation (6) and evaluating the integral gives the interferogram coherence $$\gamma(\tau_0, \Delta\nu; T) = \zeta_T(\tau_0, \Delta\nu)\cos[\Phi_0 + \Phi_T(\tau_0, \Delta\nu)] \quad (9)$$

where $\tau_0 = LB(\nu_0)/c$ is the interferometer time delay, $\Phi_0 = 2\pi\nu_0\tau_0$ is the centre frequency phase delay and the temperature-dependent interferogram phase shift is given approximately by $$\tan\varphi_T = (\rho_0 - 3)\frac{\kappa_0\varphi_0}{3}\left(\frac{\Delta\nu}{\nu_0}\right) \equiv (\rho_0 - 3)\frac{\hat{\varphi}}{3}\frac{\Delta\nu}{\nu_0} \quad (10)$$

where $$\hat{\Phi} \equiv \kappa_0\Phi_0(\Delta\nu/\nu_0) = 2\pi\tau_0\kappa_0\Delta\nu \quad (11)$$

is a scaled phase shift coordinate and $\Delta\nu$ is half the optical bandwidth of the received radiation.

For a birefringent delay plate of thickness L and birefringence $B(\nu)$, the interferometric time delay at frequency $\nu_0$ is given by $\tau_0 = LB(\nu_0)/c$, and the factor $$\kappa_0 = 1 + \frac{\nu_0}{B}\frac{\partial B}{\partial \nu}\bigg|_{\nu_0} \quad (12)$$

accounts for the wavelength dependence of the birefringence $B(\nu)$.

Expression (10) is valid provided $\hat{\Phi}^2/15 \ll 1$. To lowest order, the phase shift is zero when $\rho_0 = 3$, corresponding to the peak of the blackbody curve ($\rho_{peak} = 2.822$).

While the fringe frequency changes with temperature, the fringe contrast envelope falls quadratically with delay $$\zeta_T(\tau, \Delta\nu) = 1 - \frac{\hat{\varphi}^2}{6} \quad (13)$$

and is insensitive to the temperature to lowest order in $\Delta\nu/\nu_0$. As expected, this result shows that the coherence length (the required delay for a significant reduction in fringe contrast) is inversely proportional to the width of the optical pass band. The choice of delay offset (operating point) $\Phi_0$ is a balance between the loss of fringe contrast attending large delay and the temperature-dependent phase shift $\Phi_T$ which increases with $\hat{\Phi}$.

The phase modulation, which is applied electro-optically, has amplitude $\Phi_1$ given by $$\varphi_1 = \frac{\pi E L \nu_0}{c}\Delta \quad (14)$$

where E is the electric field strength applied across the modulating element, L is the element length and $\Delta$ is a constant characterising the strength of the electro-optic effect. When operating at infrared wavelengths, and for reasonable crystal dimensions and applied voltages, the phase modulation amplitude $\Phi = \Phi_1 \sin\Omega t$ is generally small ($\leq 1$). Under these conditions, Equations (9) and (5) can be combined, and the Bessel expansion used to obtain the amplitude of the interferometer signal, S, is given by $$S = \frac{I_0}{2}[1 + J_0(\varphi_1)\zeta_c - 2J_1(\varphi_1)\zeta_s\cos 2\Omega t] \quad (15)$$

where $I_0 = H_\nu(\nu_0)\Delta\nu$ is the spectrally integrated radiant power in the measurement pass band and $(\zeta_c, \zeta_s) = \zeta_T[\cos(\Phi_T+\Phi_0), \sin(\Phi_T+\Phi_T)]$.

For modulation about a peak in the interferogram, the modulation signal predominantly occurs at twice the modulation rate (second harmonic). When the temperature changes, the peak (or trough) position also shifts. The generated signal registers this as a change in the ration of fundamental and second harmonic amplitudes. The tangent of the appropriately weighted second and first harmonic amplitudes measures the phase in the modulation cycle at which the interferogram turning point (related to $\lambda_M$) is encountered. An important advantage of this measurement scheme is that the desired information is shifted onto carriers displaced from dc. As seen in FIG. 3, the position of the interferogram zero crossing also shifts with temperature. In this case, the information can be extracted from the ratio of the fundamental (modulation amplitude) and dc signal components.

Figure 6:
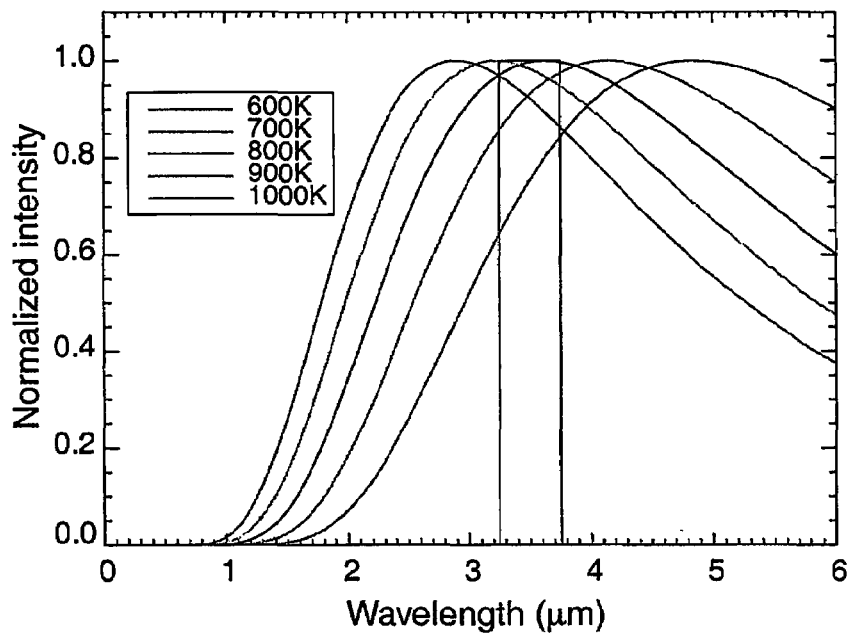
FIG. 6 presents normalised blackbody spectra for temperatures in the range 600K to 1000K, with a superimposed ideal band pass filter.
Figure 7:
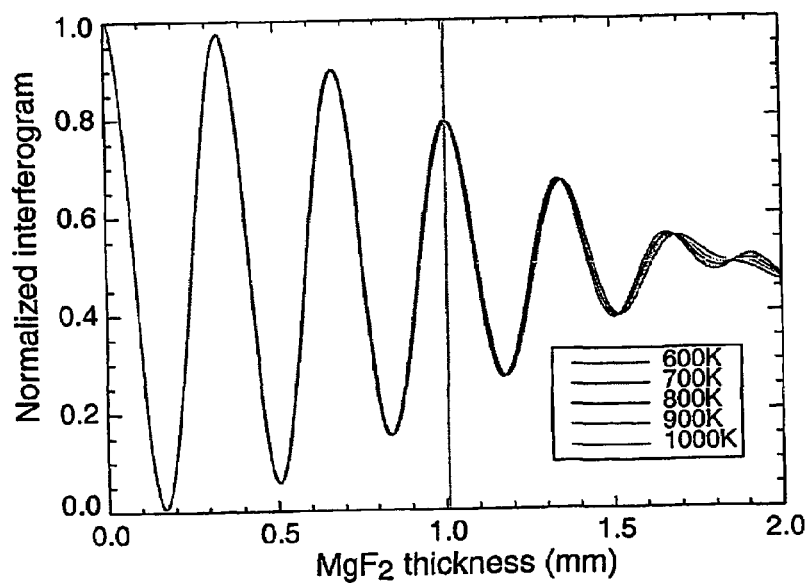
FIG. 7 shows normalised interferograms for the spectra of FIG. 6, for the pass band 3.25 to 3.75 $\mu$m.

With the appropriately filtered ideal blackbody spectral radiance $H_\nu$ it is possible to now compute the resulting modulation signal transform using Equation (6). As an example, the normalised blackbody spectra for temperatures in the range 600K to 1000K is shown in FIG. 6 and their associated interferograms, after filtering by an ideal narrow band pass filter transmitting between 3.25 and 3.75 μm ($\Delta\nu/\nu_0 = 1/14$), are presented in FIG. 7. The interferogram is plotted as a function of the thickness of a magnesium fluoride waveplate ($\kappa_0 = 1.267$).

Using Equation (15), the fundamental and second harmonic amplitudes are obtained as $$S_1 = I_0\zeta_T(\tau_0)J_1(\Phi_1)\sin\Phi_T \quad (16)$$

$$S_2 = I_0\zeta_T(\tau_0)J_2(\Phi_1)\cos\Phi_T \quad (17)$$

where $\Phi_0 \equiv \Phi_0^{(n)}2 = \pi\nu_0\tau_n$, where $\tau_n = n/\nu_0$ corresponds to modulation about the nth interferogram peak. The weighted ratio of the harmonic amplitudes, Q, is related to the source temperature through its dependence on the sensitivity factor $\rho_0$ (see FIG. 5):

$$Q = \frac{J_2(\varphi_1)S_1}{J_1(\varphi_1)S_2} = \tan\varphi = (\rho_0 - 3)\frac{\hat{\varphi}}{3}\left(\frac{\Delta\nu}{\nu_0}\right). \quad (18)$$

It is very significant that in forming the harmonic ratio to obtain $\Phi_T$, any dependence on the emission intensity or the fringe contrast (including instrumental components) has been removed.

Alternatives and Modifications

Persons skilled in the field of pyrometry will appreciate that examples only of the present invention have been described above, and that variations to and modifications of the described embodiments may be made without departing from the present inventive concept.

One modification of the present invention is to measure a parameter known as the "modulation ratio", instead of the harmonic amplitude ratio, when observing the recombined components after passage through the electro-optical element of the present invention.

As already noted above, with reference to FIG. 2, if the net delay of the components within the electro-optical element of the present invention is below the first interferogram zero, shown by the region A in the graphical representation 18 of FIG. 2, the slope of the interferogram increases with temperature, while the fringe visibility decreases. These two effects work in concert so that, at a given temperature of the radiating body, the variation in the delay length that is introduced when the electro-optical crystal of the interferometer is modulated sinusoidally, produces a variation in the intensity, S, of the detected radiation. The resultant "modulation ratio", $\zeta$, is given by the formula $$\zeta = \frac{S_{max} - S_{min}}{S_{max} + S_{min}}$$

and increases monotonically with temperature. Since the received intensity depends on the emissivity and is strongly temperature dependent, it is necessary to use a normalised measure to indicate the absolute temperature.

The modulation ratio $\zeta$ is roughly proportional to the amplitude of the delay modulation while the operating point can also be optimised for greater sensitivity to temperature changes within a certain temperature interval, but with smaller temperature dynamic range.

Experimental work and theoretical calculations have shown that the modulation ratio $\zeta$ (a) is a function of the temperature of the radiator being observed;

(b) for a given temperature, is dependent on the applied modulating voltage (which can be electro-optically tuned within a reasonable range by applying an appropriate dc bias voltage); and (c) is also dependent on the "operating point" (which is the minimum delay excursion during a modulation cycle).

Thus, provided the modulating voltage and the operating point are selected to be appropriate values for the temperature of the body being monitored, and have fixed values, a measurement of the "modulation ratio" provides an indication of the blackbody temperature of the body being monitored.

The numerical analyser described above can be programmed to compute the "modulation ratio" with an appropriate algorithm.

However, the modulation ratio is equivalent to the ratio of the amplitude of the interferogram signal at the voltage modulation frequency (the fundamental modulation frequency) to the dc amplitude of the interferogram signal. This ratio is subject to "flicker noise" or "1/f noise". Thus this alternative arrangement for monitoring the temperature of a radiating body is not preferred.

The invention claimed is:

1. An electro-optically modulated birefringent filter comprising, in sequence, (a) a band pass filter, which permits the passage therethrough of radiation from a radiating body in a predetermined wavelength band;

(b) a first polariser;

(c) an electro-optical element which, when a voltage is applied to it, splits incident polarised radiation into first and second orthogonally polarised components which travel through said element at different velocities;

(d) a second polariser, to combine said components as they exit from said electro-optical element; and (e) observing means to observe the intensity value at the point in the interferogram produced by combining said first and second components;

characterised in that (f) a voltage supply means, adapted to supply a periodically varying voltage, is operatively connected to said electro-optical element to produce a modulated birefringence of said element;

(g) said electro-optical element is configured so that, in the absence of an applied modulating voltage, the net optical path length delay between said first and second components is such that, on combination of said components, said intensity value is the intensity value at or near a peak or a trough in said interferogram; and (h) said observing means includes means to generate a signal indicative of the observed intensity value, said signal being input to analysing means which evaluates the harmonic amplitude ratio, which is the ratio of the amplitudes of the intensity at the fundamental and second harmonic of the frequency of the modulating voltage, at the observed point of the interferogram.

2. An electro-optically modulated filter as defined in claim 1 in which said analysing means is a numerical analyser which is programmed to compute said harmonic amplitude ratio.

3. An electro-optically modulated filter as defined in claim 1, in which said analyzing means is a numerical analyser which is programmed to compute said harmonic amplitude ratio, compare it with a calibration look-up table stored in said numerical analyser, and to display the temperature indicated in said look-up table.

4. An electro-optically modulated filter as defined in claim 1, in which said electro-optical element is an electro-optical element selected from the group consisting of (a) two crossed uniaxial birefringent crystals, each propagating radiation along the crystal Y-axis, with a bias voltage applied to produce a predetermined short delay of one of said polarised components relative to the other component;

(b) two crossed uniaxial birefringent crystals, each propagating radiation along the crystal Y-axis, with no bias voltage applied, in series with a birefringent trim plate to produce a predetermined short delay of one of said polarised components relative to the other component;

(d) an electro-optical crystal propagating along the Z-axis, with no bias voltage applied, in series with a birefringent trim plate to produce a predetermined short delay of one of said polarised components relative to the other component; and (d) an isotropic electro-optical plate with no bias voltage applied, in series with a birefringent trim plate to produce a predetermined short delay of one of said polarised components relative to the other component.

5. An electro-optically modulated filter as defined in claim 4 in which said analysing means is a numerical analyser which is programmed to compute said harmonic amplitude ratio.

6. An electro-optically modulated filter as defined in claim 4 in which said analyzing means is a numerical analyser which is programmed to compute said harmonic amplitude ratio, compare it with a calibration look-up table stored in said numerical analyser, and to display the temperature indicated in said look-up table.

7. An electro-optically modulated filter as defined in claim 1 or 4, in which said periodically varied voltage is a sinusoidally varied voltage.

8. An electro-optically modulated filter as defined in claim 7 in which said analysing means is a numerical analyser which is programmed to compute said harmonic amplitude ratio.

9. An electro-optically modulated filter as defined in claim 7 in which said analyzing means is a numerical analyser which is programmed to compute said harmonic amplitude ratio, compare it with a calibration look-up table stored in said numerical analyser, and to display the temperature indicated in said look-up table.

10. A method for the estimation of the temperature of a body emitting radiation in the infrared and/or visible region of the electromagnetic spectrum, said method comprising
    (a) selecting radiation from said body within a predetermined wavelength band;
    (b) polarising said selected radiation by passing it through a first polariser;
    (c) passing said polarised selected radiation through a birefringent element to split said polarised radiation into first and second orthogonally polarised components which travel through said birefringent element at differing velocities, so that, on leaving said element, there is an optical path length delay of one of said polarised components relative to the other component within said birefringent element;
    (d) passing said components through a second polariser to combine said components; and
    (e) observing the intensity value at the point in the interferogram produced by combining said first and second components;
characterised in that said birefringent element is an electro-optical birefringent element which is configured so that the net optical path delay between said first and second components is such that, on combination of said components, said intensity value is the intensity value at or near a peak or a trough in said interferogram; and further characterised by the additional steps of
    (f) modulating the optical path length delay in said electro-optical element, by applying a periodically varied voltage to said electro-optical element;
    (g) calculating the harmonic amplitude ratio, which is the ratio of the amplitudes of the observed intensity at the fundamental and second harmonic of the frequency of the modulating voltage, at the observed point of the interferogram; and
    (h) determining, from the value of said harmonic amplitude ratio, the temperature of said radiating body by comparing said harmonic amplitude ratio with values of this ratio in a calibration look-up table.

11. A method as defined in claim 10, in which said electro-optical element is an electro-optical element selected from the group consisting of:
    (a) two crossed uniaxial birefringent crystals, each propagating radiation along the crystal Y-axis, with a bias voltage applied to produce a predetermined short delay of one of said polarised components relative to the other component;
    (b) two crossed uniaxial birefringent crystals, each propagating radiation along the crystal Y-axis, with no bias voltage applied, in series with a birefringent trim plate which produces a predetermined short delay of one of said polarised components relative to the other component;
    (c) an electro-optical crystal propagating along the Z-axis, with no bias voltage applied, in series with a birefringent trim plate which produces a predetermined short delay of one of said polarised components relative to the other component; and
    (d) an isotropic electro-optical plate with no bias voltage applied, in series with a birefringent trim plate which produces a predetermined short delay of one of said polarised components relative to the other component.

12. A method as defined in claim 10 or claim 11, in which said periodically varied voltage is a sinusoidally varied voltage.

* * * * *